United States Patent
Chu et al.

(10) Patent No.: US 12,093,828 B2
(45) Date of Patent: Sep. 17, 2024

(54) IMAGE PROCESSING METHOD AND APPARATUS BASED ON SUPER NETWORK, AND COMPUTER STORAGE MEDIUM

(71) Applicant: Beijing Xiaomi Pinecone Electronics Co., Ltd., Beijing (CN)

(72) Inventors: Xiangxiang Chu, Beijing (CN); Ruijun Xu, Beijing (CN); Bo Zhang, Beijing (CN); Bin Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 745 days.

(21) Appl. No.: 17/028,876

(22) Filed: Sep. 22, 2020

(65) Prior Publication Data
US 2021/0334661 A1   Oct. 28, 2021

(30) Foreign Application Priority Data
Apr. 26, 2020   (CN) .......................... 202010338426.3

(51) Int. Cl.
| | |
|---|---|
| *G06N 3/082* | (2023.01) |
| *G06F 18/214* | (2023.01) |
| *G06N 3/045* | (2023.01) |
| *G06N 3/063* | (2023.01) |
| *G06V 10/764* | (2022.01) |
| *G06V 10/82* | (2022.01) |

(52) U.S. Cl.
CPC ........... *G06N 3/082* (2013.01); *G06F 18/214* (2023.01); *G06N 3/045* (2023.01); *G06N 3/063* (2013.01); *G06V 10/764* (2022.01); *G06V 10/82* (2022.01);

(58) Field of Classification Search
CPC ........ G06N 3/082; G06N 3/045; G06N 3/063; G06N 3/084; G06F 18/214; G06V 10/764; G06V 10/82
See application file for complete search history.

(56) References Cited

U.S. PATENT DOCUMENTS

| | | | |
|---|---|---|---|
| 9,342,749 B2 * | 5/2016 | Li | .................. G06F 18/2148 |
| 2020/0082275 A1 | 3/2020 | Sun et al. | |

FOREIGN PATENT DOCUMENTS

| | | |
|---|---|---|
| CN | 110782034 A | 2/2020 |
| CN | 110956262 A | 4/2020 |

OTHER PUBLICATIONS

Cai, ProxylessNAS: Direct Neural Architecture Search on Target Task and Hardware, arXiv, 2019. (Year: 2019).*

(Continued)

*Primary Examiner* — Aniss Chad
*Assistant Examiner* — Shien Ming Chou
(74) *Attorney, Agent, or Firm* — Oblon, McClelland, Maier & Neustadt, L.L.P.

(57) ABSTRACT

The present disclosure relates to an image processing method and apparatus based on a super network, and a computer storage medium. The method can include that a pretrained backbone network is merged with a rear end of a target detection network to obtain a merged super network, the merged super network is trained, Neural Architecture Search (NAS) is performed based on the trained super network to obtain a target detection neural architecture, and an image to be processed is processed by using the target detection neural architecture to obtain an image processing result.

5 Claims, 9 Drawing Sheets

(56) References Cited

OTHER PUBLICATIONS

Bender, Understanding and Simplifying one-shot Architecture Search, Proceeding of the 35th International Conference on Machine Learning, 2018 (Year: 2018).*

Dong, One-Shot Neural Architecture Search via Self-Evaluated Template Network, 2019 IEEE CVF International Conference on Computer Vision ICCV (Year: 2019).*

Extended European Search Report issued Mar. 16, 2021 in European Patent Application No. 20200022.0, 9 pages.

Zichao Guo, et al., "Single Path One-Shot Neural Architecture Search with Uniform Sampling," Retrieved from the Internet [URL: https://arxiv.org/pdf/1904.00420.pdf], XP055697880, Apr. 6, 2019, pp. 1-14.

Thomas Elsken, et al., "Neural Architecture Search: A Survey," Journal of Machine Learning Research, vol. 20, XP055710476, Apr. 26, 2019, pp. 1-21.

Xiangkun et al., "Airplane Object Detection in High Resolution Remote Sensing Imagery Based on Multi-structure Convolutional Neural Network", Computer Engineering, vol. 43, No. 1, Jan. 15, 2017, pp. 259-267.

* cited by examiner

IMAGE PROCESSING METHOD AND APPARATUS BASED ON SUPER NETWORK, AND COMPUTER STORAGE MEDIUM

CROSS-REFERENCE TO RELATED APPLICATIONS

This application is filed based upon and claims priority to Chinese patent application No. 202010338426.3, filed on Apr. 26, 2020, the entire contents of which are incorporated herein by reference.

BACKGROUND

In the related art, the target detection Neural Architecture Search (NAS) is generally used to first train a backbone network for extracting a feature, then fix parameters of the backbone network, and connect the backbone network to a target detection network. Sub-networks are obtained by searching a rear end of the target detection network. However, the sub-networks obtained by the solutions have a relative simple structure, which limits the performance of the finally searched network structure.

SUMMARY

The present disclosure relates to the technical field of deep learning, and more particularly to an image processing method and apparatus based on a super network, and a computer storage medium. Exemplary embodiments of the present disclosure provide a method and apparatus for processing an image based on a super network, and an intelligent device.

According to a first aspect of the present disclosure, an image processing method based on a super network is provided. The method can include that pretrained backbone network is merged with a rear end of a target detection network to obtain a merged super network. The backbone network can include a classified super network in a search space of the pretrained backbone network and the classified super network is configured to extract an image feature from image information. The rear end of the target detection network can include a target detection rear-end super network in a search space of the rear end of the target detection network, the target detection rear-end super network is configured to perform target detection based on the image feature. The method can further include that the merged super network is trained, NAS is performed based on the trained super network to obtain a target detection neural architecture, and an image to be processed is processed by using the target detection neural architecture to obtain an image processing result.

According to a second aspect of the present disclosure, an image processing apparatus based on a super network is provided. The apparatus can include a processor and a memory configured to store instructions executable for the processor. The processor can be configured to execute the instructions to perform an operation that a pretrained backbone network is merged with a rear end of a target detection network to obtain a merged super network. The backbone network can include a classified super network in a search space of the pretrained backbone network and the classified super network is configured to extract an image feature from image information. The rear end of the target detection network includes a target detection rear-end super network in a search space of the rear end of the target detection network, and the target detection rear-end super network is configured to perform target detection based on the image feature. The processor can be configured to execute the instructions to further perform an operation that the merged super network is trained, the NAS is performed based on the trained super network to obtain a target detection neural architecture, and an image to be processed is processed by using the target detection neural architecture to obtain an image processing result.

According to a third aspect of the present disclosure, a non-transitory computer-readable storage medium having computer programs stored thereon is provided and the program is executed by a processor to implement the steps including that a pretrained backbone network is merged with a rear end of a target detection network to obtain a merged super network. The backbone network includes a classified super network in a search space of the backbone network and the classified super network is configured to extract an image feature from image information. The rear end of the target detection network includes a target detection rear-end super network in a search space of the rear end of the target detection network, and the target detection rear-end super network is configured to perform target detection based on the image feature. The processor can further implement the steps including that the merged super network is trained, NAS is performed based on the trained super network to obtain a target detection neural architecture, and an image to be processed is processed by using the target detection neural architecture to obtain an image processing result.

It is to be understood that the above general descriptions and detailed descriptions below are only exemplary and explanatory, and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some exemplary embodiments of the disclosure.

DETAILED DESCRIPTION

Figure 1:
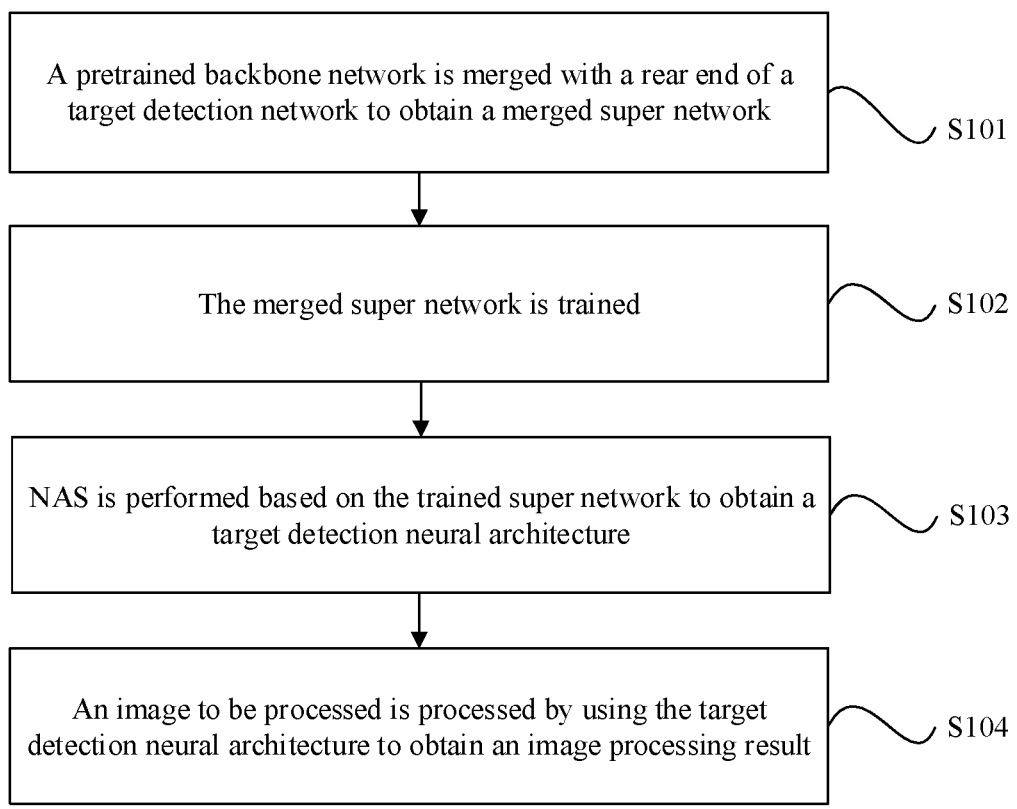
FIG. 1 illustrates a flowchart of an image processing method based on a super network according to an exemplary embodiment.

Exemplary embodiments, examples of which are illustrated in the accompanying drawings, are elaborated below.

The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

FIG. 1 illustrates a flowchart of an image processing method based on a super network according to an exemplary embodiment. The image processing method based on the super network may be applied to a terminal device, such as an intelligent mobile phone, a tablet computer and a wearable device, or may be applied to a server, such as a set of server or a server cluster composed of multiple sets of servers. As shown in FIG. 1, the image processing method based on the super network may include the following Steps S101-S104.

In step S101, a pretrained backbone network is merged with a rear end of a target detection network to obtain a merged super network. In the embodiment, the backbone network includes a classified super network in a search space of the backbone network, the classified super network is configured to extract an image feature from image information, and the rear end of the target detection network includes a target detection rear-end super network in a search space of the rear end of the target detection network, the target detection rear-end super network is configured to perform target detection based on the image feature.

For example, when the pretrained backbone network is merged with a target detection sub-network, the rear end of the backbone network may be connected to the front end of the target detection sub-network to obtain the merged super network. In an embodiment, a manner for obtaining the backbone network may further refer to the following embodiment shown in FIG. 3A, and is not detailed herein.

In step S102, the merged super network is trained. In the embodiment, after the pretrained backbone network is merged with the rear end of the target detection network, the merged super network may be trained with a preset method. Therefore, upon the completion of the training, the super network meeting the preset requirement is obtained. For example, the merged super network is trained by using a great number of image samples.

The preset method used to train the merged super network may be set by the developer or the user according to an actual service requirement, for example, a typical back propagation method, a forward propagation method, a two-way propagation method and the like may be used, which is not limited by the embodiment thereto. In another embodiment, the manner for training the super network may further refer to the following embodiment shown in FIG. 2A, and is not detailed herein.

In step S103, NAS is performed based on the trained super network to obtain a target detection neural architecture. In the embodiment, the NAS may be performed based on the trained super network by using a set search algorithm to obtain the target detection neural architecture.

The set search algorithm may be selected by the development or the user according to the actual service demand, for example, any one of the followings may be selected: a random search algorithm, a Bayes search algorithm, an evolutionary learning algorithm, a reinforcement learning algorithm, an evolutionary and reinforcement learning combined algorithm, and a gradient-based algorithm.

Figure 4:
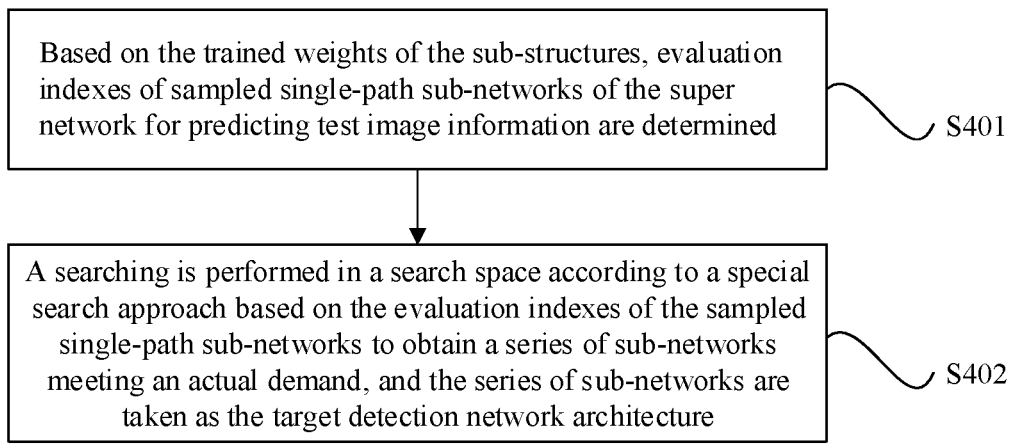
FIG. 4 illustrates a flowchart on how to perform NAS based on a trained super network to obtain a target detection neutral architecture according to an exemplary embodiment.

In an embodiment, the manner that the NAS is performed based on the trained super network to obtain the target detection neural architecture may refer to the following embodiment shown in FIG. 4, and is not detailed herein.

In step S104, an image to be processed is processed by using the target detection neural architecture to obtain an image processing result. In the embodiment, after the target detection neural architecture is obtained, the image to be processed may be input to the target detection neural architecture, such that the target detection neural architecture is used to process the image to be processed to obtain the image processing result.

From the above description, in the embodiment, the pretrained backbone network is merged with the rear end of the target detection network, the merged super network is trained, the NAS is performed based on the trained super network to obtain the target detection neural architecture, and the image to be processed is processed by using the target detection neural architecture to obtain the image processing result. As the pretrained backbone network is merged with the rear end of the target detection network, the merged super network is trained and the NAS is performed, the training efficiency of the super network may be improved; and meanwhile, as the NAS is performed on the trained super network, an enough abundant search space may be ensured to perform the NAS, thereby improving the image processing performance of the searched network structure.

Figure 2A:
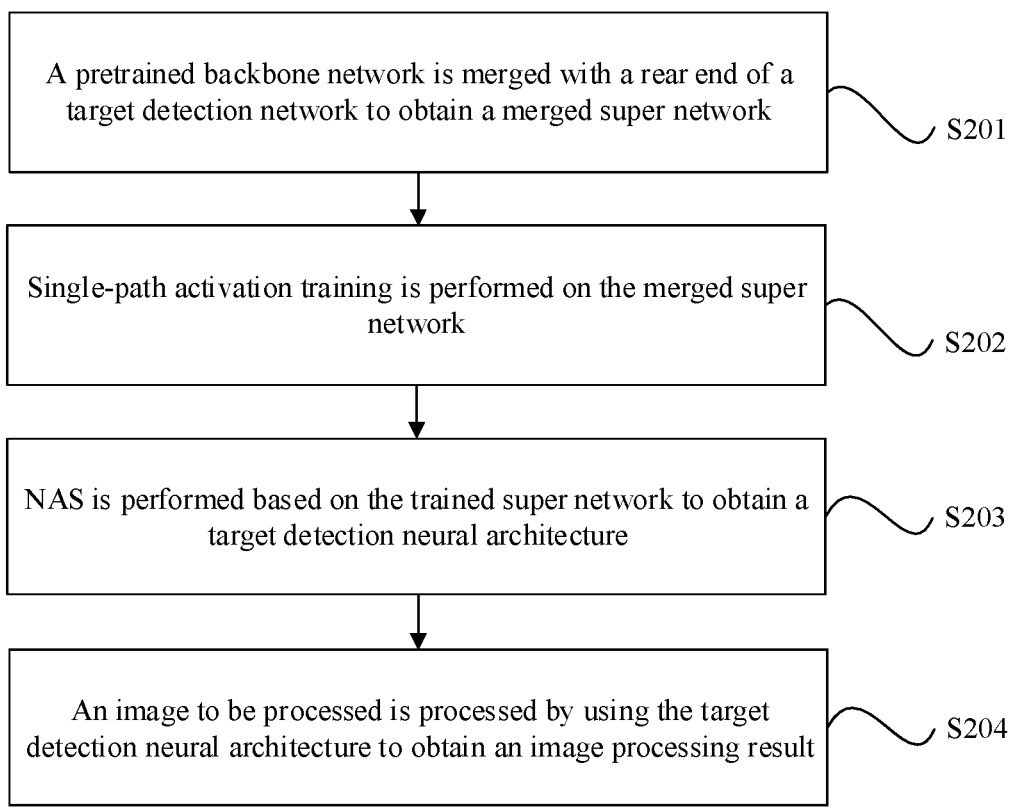
FIG. 2A illustrates a flowchart of an image processing method based on a super network according to another exemplary embodiment.
Figure 2B:
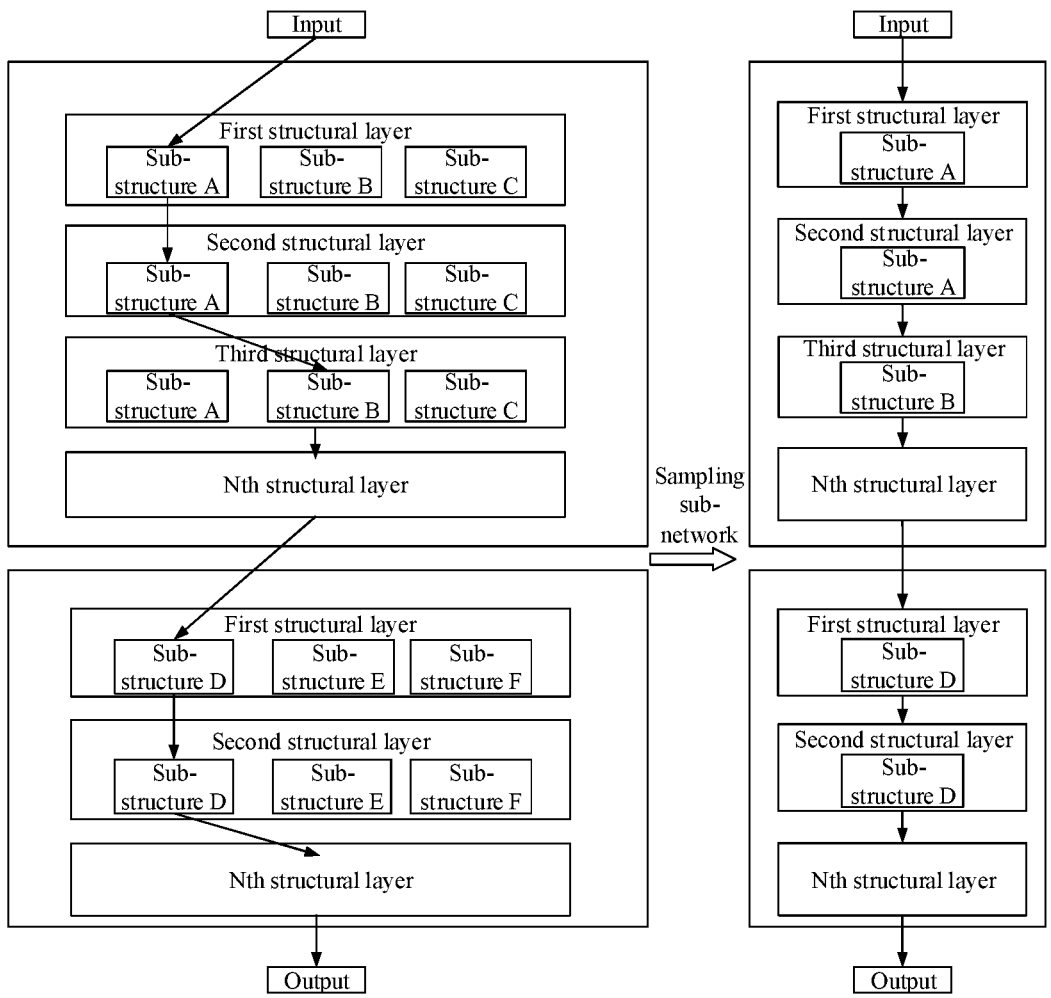
FIG. 2B illustrates a structural schematic diagram of a super network according to an exemplary embodiment.

FIG. 2A illustrates a flowchart of an image processing method based on a super network according to another exemplary embodiment. FIG. 2B illustrates a structural schematic diagram of a super network according to an exemplary embodiment. The image processing method based on the super network may be applied to a terminal device, such as an intelligent mobile phone, a tablet computer and a wearable device, or may be applied to a server, such as a set of server or a server cluster composed of multiple sets of servers. As shown in FIG. 2A, the image processing method based on the super network may include the following Steps S201-S204.

In step S201, a pretrained backbone network is merged with a rear end of a target detection network to obtain a merged super network. The backbone network includes a classified super network in a search space of the backbone network, the classified super network is configured to extract an image feature from image information, and the rear end of the target detection network includes a target detection rear-end super network in a search space of the rear-end of the target detection network, the target detection rear-end super network is configured to perform target detection based on the image feature.

In S202, single-path activation training is performed on the merged super network. As shown in FIG. 2B, the merged super network includes multiple structural layers (such as a first structural layer, a second structural layer, . . . , an Nth structural layer, etc.) that are sequentially and serially connected, each structural layer includes multiple sub-structures (such as a sub-structure A, a sub-structural B, . . . , a sub-structure C, etc.), outputs of the multiple sub-structures comprised in each structural layer form an output of the structural layer, and each sub-structure corresponds to a neural network basic operation unit or module.

For example, when the single-path activation training is performed on the merged super network, single-path sampling is performed on the merged super network to obtain a sampled single-path sub-network, single-step training is performed on the sampled single-path sub-network based on sample image information, and sampling and training processes are repeated until the merged super network converges (i.e., until the sub-structure in each structural layer is fully trained), to obtain a weight of each sub-structure.

In step S203, NAS is performed based on the trained super network to obtain a target detection neural architecture.

In step S204, an image to be processed is processed by using the target detection neural architecture to obtain an image processing result.

Relevant explanation and description on Steps S201, S203 and S204 may refer to the above embodiment, and are not elaborated herein.

From the above description, in the embodiment, the pretrained backbone network is merged with the rear end of the target detection network, the single-path activation training is performed on the merged super network, the NAS is performed based on the trained super network to obtain the target detection neural architecture, and the image to be processed is processed by using the target detection neural architecture to obtain the image processing result. As the pretrained backbone network is merged with the rear end of the target detection network, the merged super network is trained and the NAS is performed, the training efficiency of the super network may be improved; and meanwhile, as the single-path activation training is performed on the merged super network, and the NAS is performed on the trained super network, an enough abundant search space may be ensured to perform the NAS, thereby improving the image processing performance of the searched network structure.

Figure 3A:
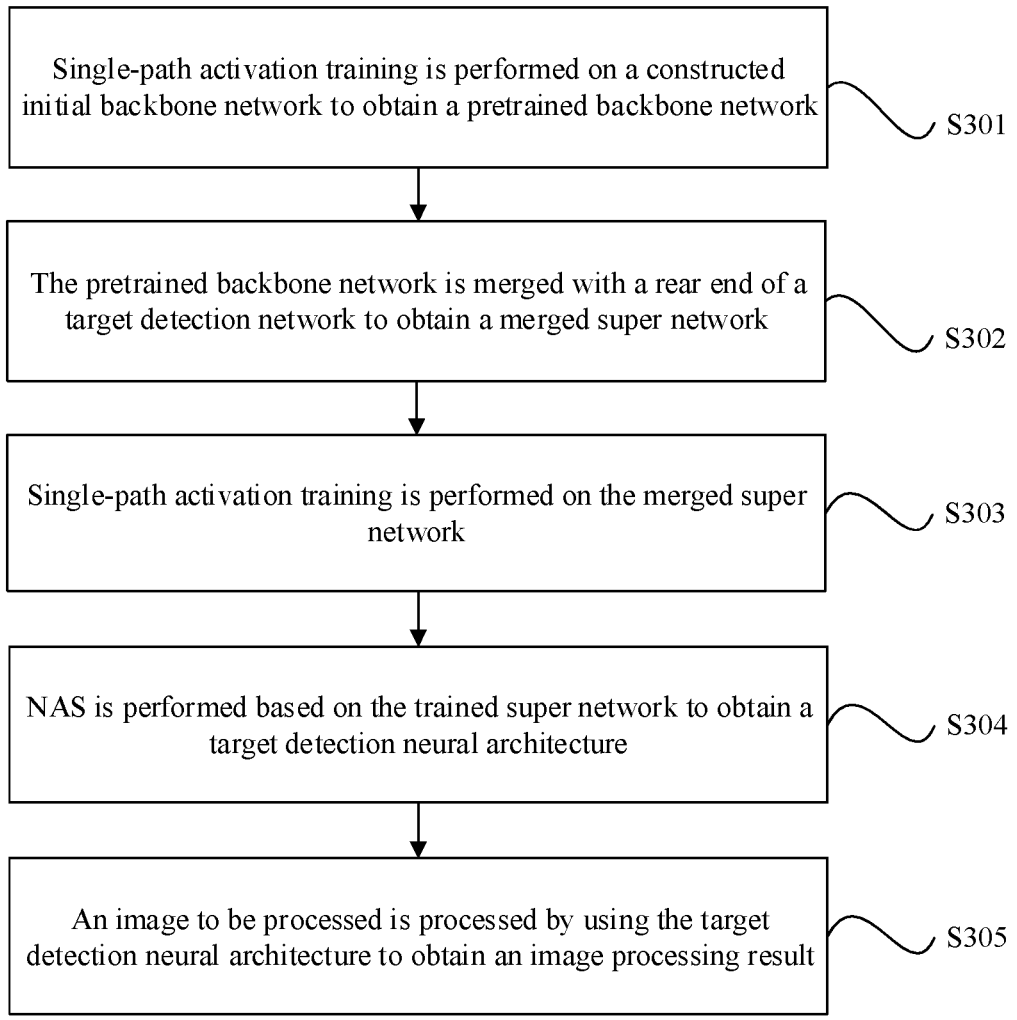
FIG. 3A illustrates a flowchart of an image processing method based on a super network according to another exemplary embodiment.
Figure 3B:
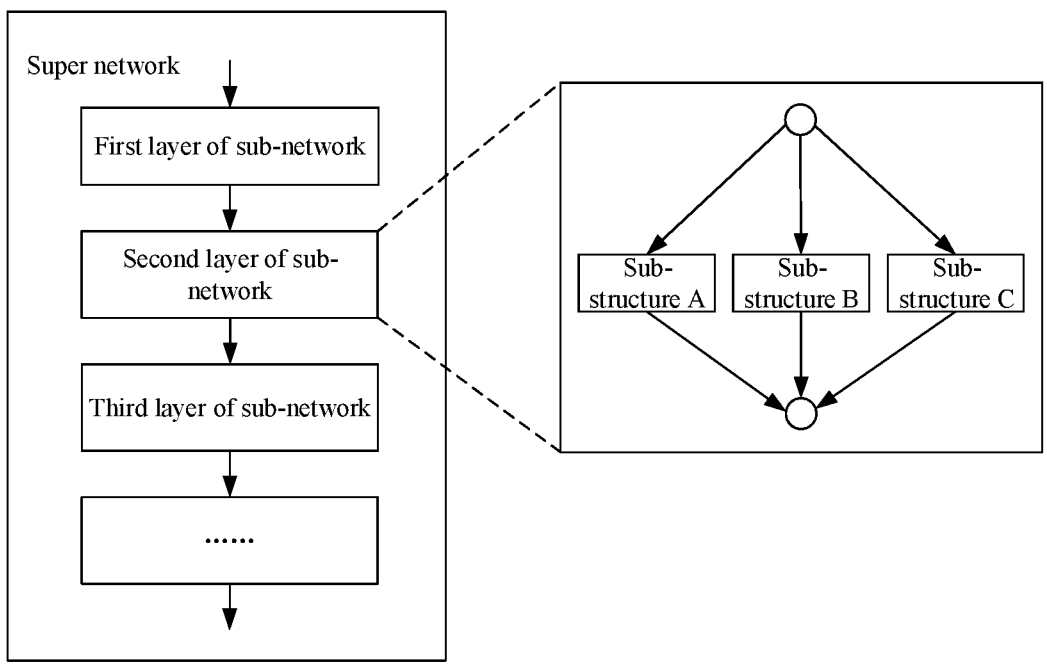
FIG. 3B illustrates a structural schematic diagram of a backbone network according to an exemplary embodiment.

FIG. 3A illustrates a flowchart of an image processing method based on a super network according to another exemplary embodiment. FIG. 3B illustrates a structural schematic diagram of a backbone network according to an exemplary embodiment. The image processing method based on the super network in the embodiment may be applied to a terminal device, such as an intelligent mobile phone, a tablet computer and a wearable device, or may be applied to a server, such as a set of server or a server cluster composed of multiple sets of servers. As shown in FIG. 3A, the image processing method based on the super network may include the following Steps S301-S305.

In step S301, single-path activation training is performed on a constructed initial backbone network to obtain the pretrained backbone network. In the embodiment, after the initial backbone network configured to classify the image feature extracted from the image information is constructed, the single-path activation training may be performed on the initial backbone network to obtain the pretrained backbone network. The backbone network is a network including respective search network spaces of the backbone network. It is to be noted that the super network is a set of multiple networks, and may serve as a network search space including multiple networks. In other words, the super network is an expression form of the search space, i.e., the super network includes all sub-networks but may also serve as a special neutral network.

For example, the structure of the initial backbone super network may refer to FIG. 3B. As shown in FIG. 3B, the initial backbone network includes multiple structural layers, such as a first structural layer, a second structural layer, . . . , an Nth structural layer, etc., that are sequentially and serially connected, each structural layer includes multiple sub-structures, such as a sub-structure A, a sub-structural B, . . . , a sub-structure C, etc., and outputs of the multiple sub-structures in each structural layer form an output of the structural layer. An input end of the sub-structure is connected to an output end of a structure layer previous to a structural layer where the input end of the sub-structure is located (i.e., the input end of each sub-structure in each structural layer is connected to the output end of the previous structural layer). Each sub-structure is configured to perform operations corresponding to the basic operation unit and module on the input feature, including but not limited to convolution, separable convolution, cavity convolution, pooling, jumper connection operation and a combination of different operations thereof. In an embodiment, the single-path activation training is performed on the initial backbone network, i.e., only a single-path sub-network is activated and trained in each step, with the following specific steps.

In Step 1, a sub-structure is taken out from a sampling pool of each layer from a first layer to a last layer of the super network, and the sub-structure taken out is no longer put back to the sampling pool.

In Step 2, sub-structures selected from all layers are connected together to form one sub-network.

The processes from Step 1 to Step 2 are repeated to obtain multiple sub-networks. Each sub-network in the multiple sub-networks is trained once, and parameters of the super network are updated according to training results of the multiple sub-networks, for example, each sub-network in the multiple sub-networks may be trained by using the back propagation (BP) method.

In step S302, the pretrained backbone network is merged with a rear end of a target detection network to obtain a merged super network. The backbone network includes a classified super network in a search space of the backbone network, the classified super network is configured to extract an image feature from image information, and the rear end of the target detection network includes a target detection rear-end super network in a search space of the rear-end of the target detection network, the target detection rear-end super network is configured to perform target detection based on the image feature.

In S303, single-path activation training is performed on the merged super network.

In S304, NAS is performed based on the trained super network to obtain a target detection neural architecture.

In S305, an image to be processed is processed by using the target detection neural architecture to obtain an image processing result.

Relevant explanation and description on Steps S302-S305 may refer to the above embodiment, and are not elaborated herein.

From the above description, in the embodiment, the single-path activation training is performed on the constructed initial backbone network to obtain the pretrained backbone network, such that the pretrained backbone network may be merged with the back end of the target detection network subsequently, the merged super network is trained and the NAS is performed to obtain the target detection neutral architecture; and therefore, an enough abundant search space may be ensured to perform the NAS, thereby improving the image processing performance of the searched network structure.

FIG. 4 illustrates a flowchart on how to perform NAS based on a trained super network to obtain a target detection neutral architecture according to an exemplary embodiment. In the embodiment, on the basis of the above embodiment, how to perform the NAS based on the trained super network to obtain the target detection neutral architecture is used as an example for exemplary description. As shown in FIG. 4, the operation that the NAS is performed based on the trained super network to obtain the target detection neural architecture in Step S103 may include the following Steps S401-S402.

In step S401, based on the trained weights of the sub-structures, evaluation indexes of the sampled single-path sub-networks of the super network for predicting test image information are determined. In the embodiment, after the merged super network is trained, the weight of each sub-structure may be obtained; and then, based on the trained weights of the sub-structures, the evaluation indexes of the sampled single-path sub-networks of the super network for predicting the test image information may be determined.

For example, after the weight of each sub-structure is obtained, the weight may be used in the sampled single-path sub-network of the super network, and thus, the sampled single-path sub-network may be used to predict the test image information to obtain the evaluation index of the text image.

The evaluation index may be set by the developer based on the actual service requirement, for example, the evaluation index is set as an accuracy, a recall rate and the like, which is not limited by the embodiment thereto.

In step S402, a searching is performed in a search space according to a special search approach based on evaluation indexes of the sampled single-path sub-networks to obtain a series of sub-networks meeting an actual demand, and the series of sub-networks are taken as the target detection network architecture. In the embodiment, after the evaluation index of each sub-network is obtained, a searching may be performed in the search space according to the special search approach based on the evaluation indexes of the sampled single-path sub-network to obtain a series of sub-networks meeting the actual demand, and the series of sub-networks are taken as the target detection network architecture.

The special search approach may be selected by the developer based on the actual service requirement, for example, the evolutionary algorithm, the random search method, the reinforced learning method and the like are selected, which is not limited by the embodiment thereto. Upon that, the actual requirement may include that the energy consumption and the evaluation index reach the best balance, etc.

From the above description, in the embodiment, based on the trained weights of the sub-structures, the evaluation indexes of the sampled single-path sub-networks of the super network for predicting the test image information are determined, and a searching is performed in the search space according to the special search approach based on the evaluation indexes of the sampled single-path sub-networks to obtain a series of sub-networks meeting the actual demand, and the series of sub-networks are taken as the target detection network architecture, such that the image to be processed may be processed subsequently by using the target detection neutral architecture to obtain the image processing result. As the NAS is performed on the trained super network, an enough abundant search space may be ensured to perform the NAS, thereby improving the image processing performance of the searched network structure.

Figure 5:
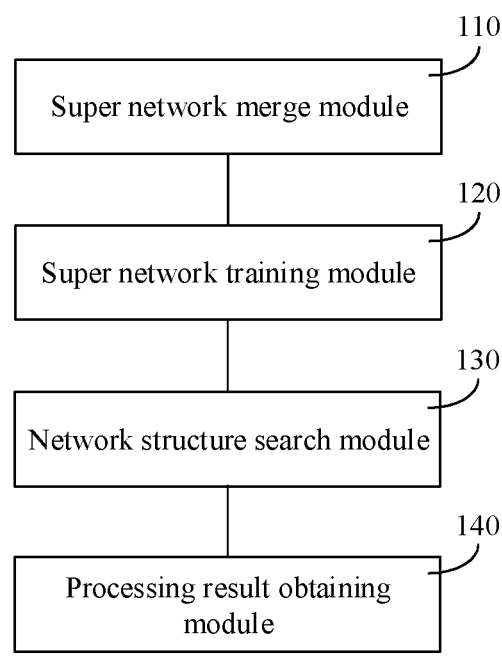
FIG. 5 illustrates a block diagram of an image processing apparatus based on a super network according to an exemplary embodiment.

FIG. 5 illustrates a block diagram of an image processing apparatus based on a super network according to an exemplary embodiment. The image processing apparatus based on the super network may be applied to a terminal device, such as an intelligent mobile phone, a tablet computer and a wearable device, or may be applied to a server, such as a set of server or a server cluster composed of multiple sets of servers.

As shown in FIG. 5, the apparatus may include: a super network merge module 110, a super network training module 120, an NAS module 130 and a processing result obtaining module 140. Of course, it should be understood that the one or more of the modules or units described in this specification may be implemented by processing circuitry.

The super network merge module 110 is configured to merge a pretrained backbone network with a rear end of a target detection network to obtain a merged super network, herein the backbone network includes a classified super network in a search space of the backbone network, the classified super network is configured to extract an image feature from image information, and the rear end of the target detection network includes a target detection rear-end super network in a search space of the rear end of the target detection network, the target detection rear-end super network is configured to perform target detection based on the image feature.

The super network training module 120 is configured to train the merged super network. The NAS module 130 is configured to perform NAS based on the trained super network to obtain a target detection neural architecture. The processing result obtaining module 140 is configured to process an image to be processed by using the target detection neural architecture to obtain an image processing result.

From the above description, in the embodiment, the pretrained backbone network is merged with the rear end of the target detection network, the merged super network is trained, the NAS is performed based on the trained super network to obtain the target detection neural architecture, and the image to be processed is processed by using the target detection neural architecture to obtain the image processing result. As the pretrained backbone network is merged with the rear end of the target detection network, the merged super network is trained and the NAS is performed, the training efficiency of the super network may be improved; and meanwhile, as the NAS is performed on the trained super network, an enough abundant search space may be ensured to perform the NAS, thereby improving the image processing performance of the searched network structure.

Figure 6:
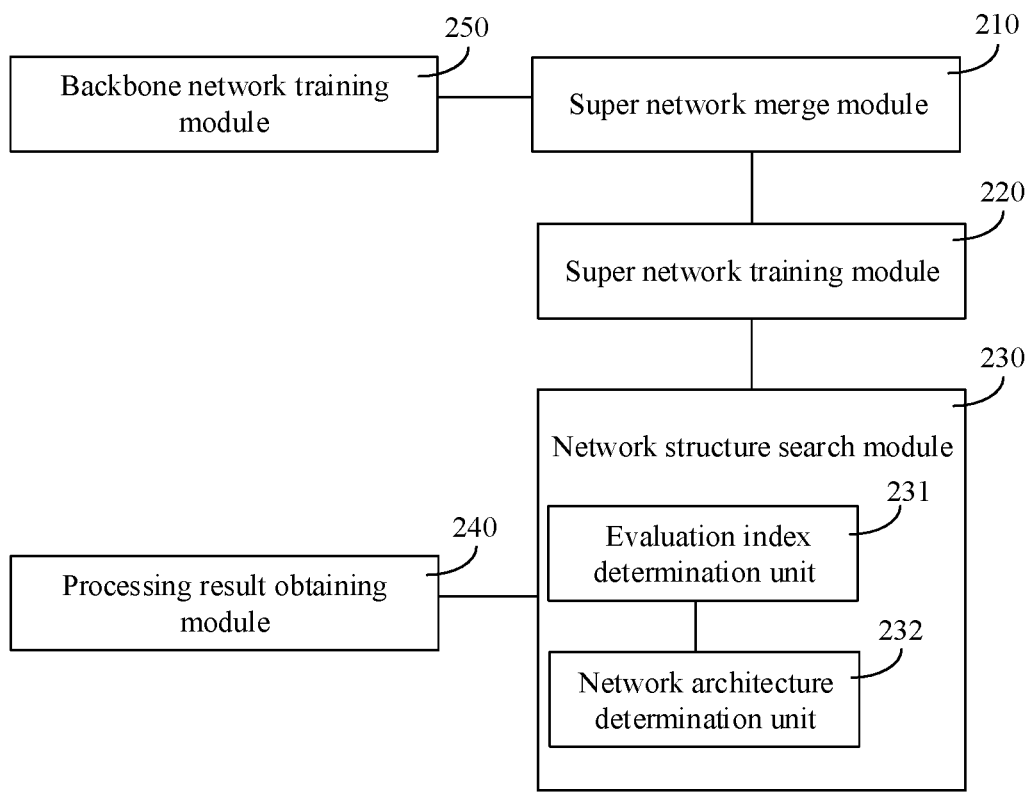
FIG. 6 illustrates a block diagram of another apparatus for processing an image based on a super network according to an exemplary embodiment.

FIG. 6 illustrates a block diagram of another apparatus for processing an image based on a super network according to an exemplary embodiment. The image processing apparatus based on the super network may be applied to a terminal device, such as an intelligent mobile phone, a tablet computer and a wearable device, or may be applied to a server, such as a set of server or a server cluster composed of multiple sets of servers. The super network merge module 210, the super network training module 220, the NAS module 230, and the processing result obtaining module 240 function the same as the super network merge module 110, the super network training module 120, the NAS module 130 and the processing result obtaining module 140 in the embodiment shown in FIG. 5, and are no longer elaborated herein.

In the embodiment, the merged super network may include multiple structural layers that are sequentially and serially connected, each structural layer includes multiple sub-structures, outputs of the multiple sub-structures comprised in each structural layer form an output of the structural layer, and each sub-structure corresponds to a neural network basic operation unit or module. The super network training module 220 may further be configured to perform single-path activation training on the merged super network.

In an embodiment, the super network training module 220 may further be configured to perform single-path sampling on the merged super network to obtain a sampled single-path sub-network, perform single-step training on the sampled single-path sub-network based on sample image information, and repeat sampling and training processes until the merged super network converges to obtain a weight of each sub-structure.

In an embodiment, the apparatus may further include a backbone network training module 250 that is configured to perform the single-path activation training on the constructed initial backbone network to obtain the pretrained backbone network.

In an embodiment, the NAS module 230 may include an evaluation index determination unit 231 that is configured to determine, based on the trained weights of the sub-structures, evaluation indexes of the sampled single-path sub-networks of the super network for predicting test image information, and a network architecture determination unit 232 that is configured to perform a searching in a search space according to a special search approach based on evaluation indexes of the sampled single-path sub-networks to obtain a series of sub-networks meeting an actual demand, and take the series of sub-networks as the target detection network architecture.

For the apparatus in the foregoing embodiment, a specific manner of each module in the apparatus performing an operation is already described in the method-related embodiment in detail, and is no longer described herein in detail.

Figure 7:
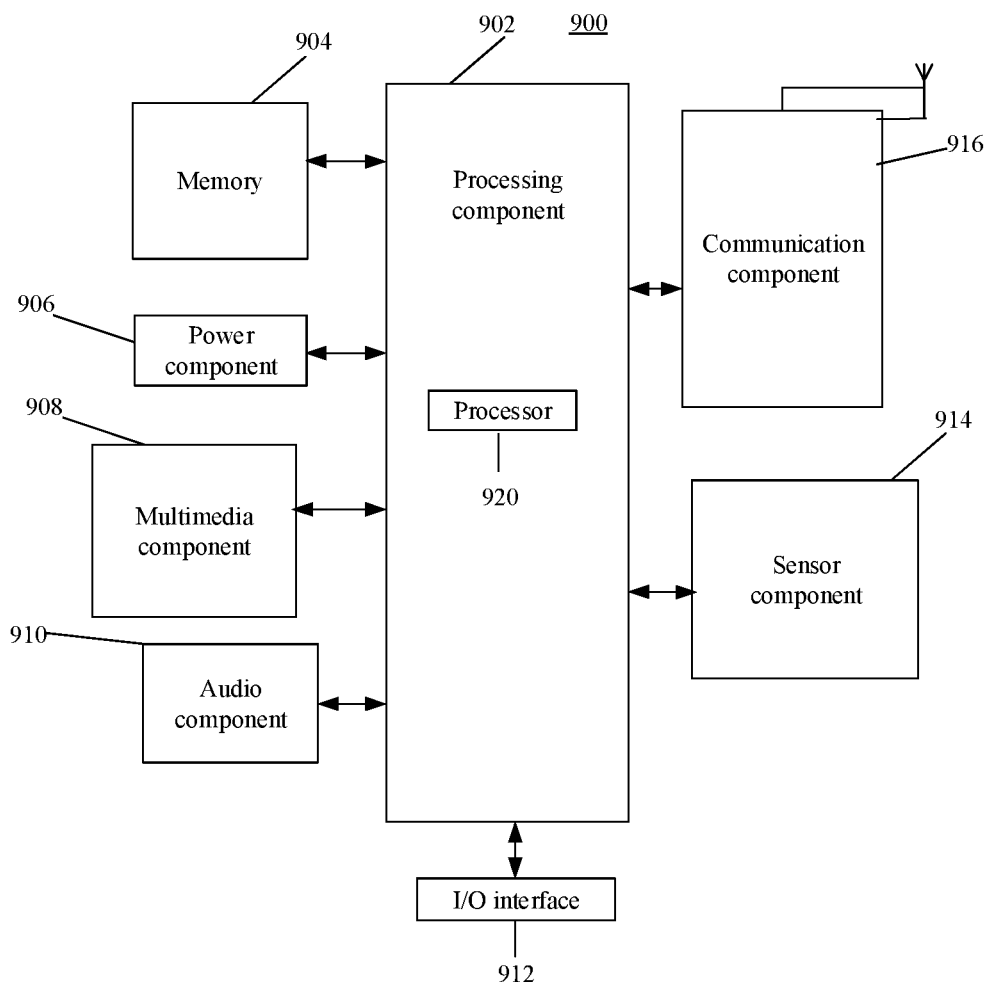
FIG. 7 illustrates a block diagram of an intelligent device according to an exemplary embodiment.

FIG. 7 illustrates a block diagram of an electronic device according to an exemplary embodiment. For example, the apparatus 900 may be a mobile phone, a computer, a digital broadcast terminal, a messaging device, a gaming console, a tablet, a medical device, exercise equipment, a PDA, and the like.

Referring to FIG. 7, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive external multimedia data when the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may further be stored in the memory 904 or transmitted via the communication component 916. In some embodiments, the audio component 910 further includes a speaker configured to output audio signals.

The I/O interface 912 provides an interface between the processing component 902 and peripheral interface modules. The peripheral interface modules may be a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an on/off status of the apparatus 900 and relative positioning of components, such as a display and small keyboard of the apparatus 900, and the sensor component 914 may further detect a change in a position of the apparatus 900 or a component of the apparatus 900, presence or absence of contact between the user and the apparatus 900, orientation or acceleration/deceleration of the apparatus 900 and a change in temperature of the apparatus 900. The sensor component 914 may include a Voice Peak Up (VPU) sensor, configured to collect voice information based on a bone conduction manner. The sensor component 914 may further include a proximity sensor, configured to detect the presence of nearby objects without any physical contact. The sensor component 914 may also include a light sensor, such as a Complementary Metal Oxide Semiconductor (CMOS) or Charge Coupled Device (CCD) image sensor, configured for use in an imaging application. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the apparatus 900 and other devices. The apparatus 900 may access a communication-standard-based wireless network, such as a WiFi network, a 2nd-Generation (2G) or 3rd-Generation (3G) network or a combination thereof. In an exemplary embodiment, the communication component 916 receives a broadcast signal or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 900 may be implemented with one or more application specific integrated circuits (ASIC), digital signal processors (DSPs), digital signal processing devices (DSPDs), programmable logic devices (PLDs), field programmable gate arrays (FPGAs), controllers, micro-controllers, microprocessors, or other electronic assembly, for performing the above image processing method based on the super network.

In an exemplary embodiment, a non-transitory computer-readable storage medium including an instruction, such as the memory 904 including the instruction, is further provided; and the above instruction may be executed by the processor 920 of the apparatus 900 to complete the image processing method based on the super network. For example, the non-transitory computer-readable storage medium may be a read only memory (ROM), a random access memory (RAM), a compact disc read-only memory (CD-ROM), a magnetic tape, a floppy disc, an optical data storage device, and the like.

The technical solutions provided by the embodiments of the present disclosure may have several beneficial effects. For example, the pretrained backbone network is merged with the rear end of the target detection network, the merged super network is trained, the NAS is performed based on the trained super network to obtain the target detection neural architecture, and the image to be processed is processed by using the target detection neural architecture to obtain the image processing result. As the pretrained backbone network is merged with the rear end of the target detection network, the merged super network is trained and the NAS is performed, the training efficiency of the super network may be improved; and meanwhile, as the NAS is performed on the trained super network, an enough abundant search space may be ensured to perform the NAS, thereby improving the image processing performance of the searched network structure.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms. Further, and as described above, the one or more of the various device components, modules, units, blocks, or portions described in the disclosure can be implemented by processing circuitry.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit).

The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, and the like, by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "I" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following principles of the present disclosure without departing from the present disclosure. The specification and examples can be shown as illustrative only, and the true scope and spirit of the disclosure are indicated by the following claims.

What is claimed is:

1. An image processing method based on a super network, performed by an image processing apparatus comprising a processor and a memory, comprising:
    merging a pretrained backbone network with a rear end of a target detection network to obtain a merged super network, the pretrained backbone network including a classified super network in a search space of the backbone network, the classified super network being configured to extract an image feature from image information, and the rear end of the target detection network including a target detection rear-end super network in a search space of the rear end of the target detection network, the target detection rear-end super network being configured to perform target detection based on the image feature;
    training the merged super network;
    performing Neural Architecture Search (NAS) based on the trained super network to obtain a target detection neural architecture; and
    processing an image to be processed using the target detection neural architecture to obtain an image processing result,
    wherein the merged super network comprises multiple structural layers that are sequentially and serially connected, each structural layer includes multiple sub-structures having outputs thereof included in each structural layer form an output of the structural layer, each sub-structure corresponds to a neural network basic operation module, and a search space of the merged super network comprises a sum of the search space of the backbone network and the search space of the rear end of the target detection network, and
    training the merged super network includes performing single-path activation training on the merged super network,
    wherein performing the single-path activation training on the merged super network further comprises:
        performing single-path sampling on the merged super network to obtain a sampled single-path sub-network. wherein the sampled single-path sub-network is formed by connecting sub-structures selected from each of the multiple structural layers;
        performing single-step training on the sampled single-path sub-network based on sample image information; and
        repeating sampling and training processes until the merged super network converges to obtain a weight of each sub-structure, and
    wherein performing the NAS based on the trained super network to obtain the target detection neural architecture further comprises:
        determining evaluation indexes of test images by using the respective obtained weights in the sampled single-path sub-networks of the super network to predict test image information; and
        performing a searching in the search space of the merged super network according to a special search approach based on the evaluation indexes of the test images determined by the sampled single-path sub-networks to obtain a series of sub-networks meeting an actual demand, and taking the series of sub-networks as the target detection network architecture with an improved image processing performance.

2. The method of claim 1, further comprising:
    performing single-path activation training on a constructed initial backbone network to obtain the pretrained backbone network.

3. An image processing apparatus based on a super network, comprising:
    a processor; and
    a memory that is configured to store instructions executable for the processor, wherein the processor is configured to execute the instructions to:
- merge a pretrained backbone network with a rear end of a target detection network to obtain a merged super network, the pretrained backbone network including a classified super network in a search space of the backbone network, the classified super network being configured to extract an image feature from image information, and the rear end of the target detection network including a target detection rear-end super network in a search space of the rear end of the target detection network, the target detection rear-end super network being configured to perform target detection based on the image feature;
- train the merged super network;
- perform Neural Architecture Search (NAS) based on the trained super network to obtain a target detection neural architecture; and
- process an image to be processed using the target detection neural architecture to obtain an image processing result, wherein the merged super network comprises multiple structural layers that are sequentially and serially connected, each structural layer includes multiple sub-structures having outputs thereof included in each structural layer form an output of the structural layer, each sub-structure corresponds to a neural network basic operation module, and a search space of the merged super network comprises a sum of the search space of the backbone network and the search space of the rear end of the target detection network, and the processor is further configured to execute the instructions to perform single-path activation training on the merged super network;

wherein the processor is further configured to execute the instructions to:
- perform single-path sampling on the merged super network to obtain a sampled single-path sub-network, wherein the sampled single-path sub-network is formed by connecting sub-structures selected from each of the multiple structural layers;
- perform single-step training on the sampled single-path sub-network based on sample image information; and
- repeat sampling and training processes until the merged super network converges to obtain a weight of each sub-structure, and wherein the processor is further configured to execute the instructions to:
- determine evaluation indexes of test images by using the respective obtained weights in the sampled single-path sub-networks of the super network to predict test image information; and
- perform a searching in the search space of the merged super network according to a special search approach based on the evaluation indexes of the test images determined by the sampled single-path sub-networks to obtain a series of sub-networks meeting an actual demand, and
- take the series of sub-networks as the target detection network architecture with an improved image processing performance.

4. The apparatus of claim 3, wherein the processor is further configured to execute the instructions to perform single-path activation training on a constructed initial backbone network to obtain the pretrained backbone network.

5. A non-transitory computer-readable storage medium having computer programs stored thereon that, when executed by an image processing apparatus based on a super network comprising a processor and a memory, cause the processor to implement operations comprising:
- merging a pretrained backbone network with a rear end of a target detection network to obtain a merged super network, the pretrained backbone network including a classified super network in a search space of the backbone network, the classified super network being configured to extract an image feature from image information, and the rear end of the target detection network including a target detection rear-end super network in a search space of the rear end of the target detection network, the target detection rear-end super network being configured to perform target detection based on the image feature;
- training the merged super network;
- performing Neural Architecture Search (NAS) based on the trained super network to obtain a target detection neural architecture; and
- processing an image to be processed by using the target detection neural architecture to obtain an image processing result, wherein the merged super network comprises multiple structural layers that are sequentially and serially connected, each structural layer includes multiple sub-structures having outputs thereof included in each structural layer form an output of the structural layer, each sub-structure corresponds to a neural network basic operation module, and a search space of the merged super network comprises a sum of the search space of the backbone network and the search space of the rear end of the target detection network, and training the merged super network includes performing single-path activation training on the merged super network,
- wherein performing the single-path activation training on the merged super network further comprises:
  - performing single-path sampling on the merged super network to obtain a sampled single-path sub-network, wherein the sampled single-path sub-network is formed by connecting sub-structures selected from each of the multiple structural layers;
  - performing single-step training on the sampled single-path sub-network based on sample image information; and
  - repeating sampling and training processes until the merged super network converges to obtain a weight of each sub-structure, and
- wherein performing the NAS based on the trained super network to obtain the target detection neural architecture further comprises:
  - determining evaluation indexes of test images by using the respective obtained weights in the sampled single-path sub-networks of the super network to predict test image information; and
  - performing a searching in the search space of the merged super network according to a special search approach based on the evaluation indexes of the test images determined by the sampled single-path sub-networks to obtain a series of sub-networks meeting an actual demand, and taking the series of sub-networks as the target detection network architecture with an improved image processing performance.

* * * * *